(12) United States Patent
Yamaguchi et al.

(10) Patent No.: US 9,791,697 B2
(45) Date of Patent: Oct. 17, 2017

(54) SCREEN

(71) Applicant: Panasonic Intellectual Property Management Co., Ltd., Osaka (JP)

(72) Inventors: Hiroshi Yamaguchi, Osaka (JP); Kazuhiro Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/360,258

(22) Filed: Nov. 23, 2016

(65) Prior Publication Data

US 2017/0168294 A1    Jun. 15, 2017

(30) Foreign Application Priority Data

Dec. 11, 2015 (JP) .................................. 2015-241830
Nov. 8, 2016 (JP) .................................. 2016-217734

(51) Int. Cl.
*G02B 27/01* (2006.01)
*G03B 21/625* (2014.01)
*G02B 27/14* (2006.01)
*G02B 5/02* (2006.01)

(52) U.S. Cl.
CPC ....... *G02B 27/0101* (2013.01); *G02B 5/0221* (2013.01); *G02B 5/0284* (2013.01); *G02B 27/142* (2013.01); *G03B 21/625* (2013.01); *G02B 2027/013* (2013.01)

(58) Field of Classification Search
CPC .. G02B 27/0101; G02B 5/0221; G03B 21/62; G03B 21/625

USPC ......................................... 359/460, 449, 459
See application file for complete search history.

(56) References Cited

U.S. PATENT DOCUMENTS

| | | | |
|---|---|---|---|
| 4,767,186 A | 8/1988 | Bradley, Jr. et al. | |
| 4,911,529 A | 3/1990 | Van De Ven | |
| 4,964,695 A | 10/1990 | Bradley, Jr. | |
| 2005/0041286 A1 | 2/2005 | White | |
| 2008/0030882 A1 | 2/2008 | Ichikawa et al. | |
| 2009/0067057 A1* | 3/2009 | Sprague ............. | G02B 27/0101 359/630 |

(Continued)

FOREIGN PATENT DOCUMENTS

| | | |
|---|---|---|
| JP | 1-161228 | 6/1989 |
| JP | 2006-243693 | 9/2006 |

(Continued)

*Primary Examiner* — Christopher Mahoney
(74) *Attorney, Agent, or Firm* — Wenderoth, Lind & Ponack, L.L.P.

(57) ABSTRACT

A screen disclosed herein is a screen having a reflectivity, which causes diffuse reflection of an image projected by a projector, and a transparency, which allows transmission of a background, and including an uneven sheet, a semi-transmissive reflecting layer, and a transparent layer. The uneven sheet includes a transparent material, and has one principal surface that is flat and the other principal surface that is an uneven surface provided with a plurality of recesses and protrusions. The first principal surface and the second principal surface are opposite to each other. The reflecting layer is formed on the uneven surface of the uneven sheet. The transparent layer covers the reflecting layer. The reflecting layer is a thin film having a thickness ranging from 2 nm to 1 μm.

10 Claims, 8 Drawing Sheets

(56) References Cited

U.S. PATENT DOCUMENTS

| | | |
|---|---|---|
| 2009/0170160 A1 | 7/2009 | Kara et al. |
| 2011/0027474 A1 | 2/2011 | Ichikawa et al. |
| 2014/0065670 A1 | 3/2014 | Kara et al. |
| 2016/0011342 A1* | 1/2016 | Griffin ................ G02B 5/0236 359/459 |
| 2016/0231565 A1* | 8/2016 | Segawa ................ B60K 35/00 |
| 2017/0038585 A1* | 2/2017 | Martinez ................ B60R 1/001 |

FOREIGN PATENT DOCUMENTS

| | | |
|---|---|---|
| JP | 2011-113068 | 6/2011 |
| JP | 2014-071250 | 4/2014 |
| JP | 2015-006193 | 1/2015 |
| JP | 2015-212800 | 11/2015 |
| WO | 2015/186668 | 12/2015 |

\* cited by examiner

SCREEN

BACKGROUND

1. Technical Field

The present disclosure relates to a screen having a reflectivity, which causes diffuse reflection of an image projected by a projector, and a transparency, which allows transmission of a background.

2. Description of the Related Art

Recent years have seen some proposals for a transparent screen that displays an image by diffusely reflecting an image projected by a projector while providing a transparency, which allows transmission of a background. For example, an image display system including such a transparent screen superimposes an image on a night view and displays it on the transparent screen mounted on a window of a high-rise building, or presents an image as if it were displayed in the air at a live performance or the like. As noted above, the transparent screen is expected to serve as a key device for realizing a new image expression using the projector.

Systems of projecting an image using a projector include a back projecting system that projects an image from a back side of a screen to display the image as a transmitted image and a front projecting system that projects an image from a front side of the screen to display the image as a reflected image. The screen for the back projecting system is referred to as a transmission-type screen, and the screen for the front projecting system is referred to as a reflection-type screen. The transparent screen that transmits a background can be used as both of these transmission-type screen and reflection-type screen.

As an example of the transparent screen, a transmission-type transparent screen including a scattering layer has been proposed (see Japanese Unexamined Patent Application Publications No. 2011-113068 and No. 2015-212800). This scattering layer is formed by dispersing a trace amount of specific diffusing particulates in a transparent body. The transmission-type transparent screen having this configuration allows the scattering layer to greatly diffuse an image projected by a projector so as to display the image as well as transmits a background rectilinearly. Furthermore, in the transmission-type transparent screen having this configuration, light diffused by the scattering layer is partially reflected by an interface between a back surface of the transmission-type transparent screen and the air. Thus, the transmission-type transparent screen can also display an image as a reflected image similarly to the screen of the front projecting system. Accordingly, the transmission-type transparent screen may be sometimes applied to a window of a commercial facility as the reflection-type transparent screen.

Moreover, as the reflection-type transparent screen, proposed is a screen that is obtained by forming on a plurality of protrusions a selective reflection layer that selectively reflects right circularly polarized laser light or left circularly polarized laser light with a specific wavelength, and coating a surface of the selective reflection layer with a transparent material (see Japanese Unexamined Patent Application Publication No. 2014-071250). This screen can not only display the projected laser light as an image but also transmit a background because it rectilinearly transmits light other than polarized light with a specific wavelength.

SUMMARY

The present disclosure provides a screen capable of transmitting a background having a close-to-original color with a high sharpness and displaying an image having a close-to-original color with a high sharpness even when using a projector having a light source other than a laser light source.

A screen according to the present disclosure is a screen having a reflectivity, which causes diffuse reflection of an image projected by a projector, and a transparency, which allows transmission of a background. The screen includes an uneven sheet, a reflecting layer that is semi-transmissive, and a transparent layer. The uneven sheet includes a transparent material, and has a first principal surface that is flat and a second principal surface that is an uneven surface provided with a plurality of recesses and protrusions, the first principal surface and the second principal surface being opposite to each other. The reflecting layer is formed on the uneven surface of the uneven sheet. The transparent layer covers the reflecting layer. The reflecting layer is a thin film having a thickness ranging from 2 nm to 1 µm.

The screen disclosed herein is capable of transmitting a background having a close-to-original color with a high sharpness and displaying an image having a close-to-original color with a high sharpness even when using a projector having a light source other than a laser light source.

Figure 1:
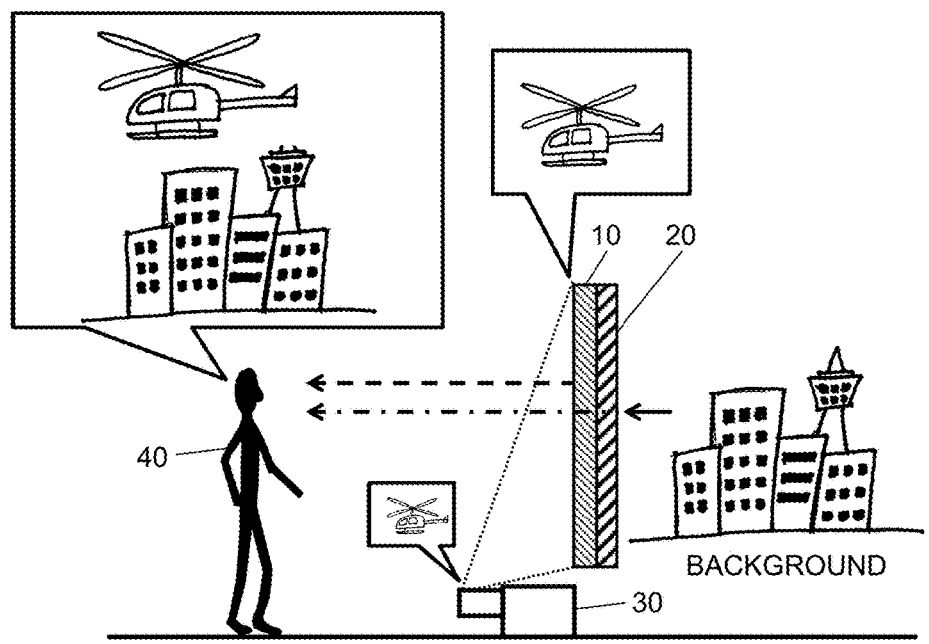
FIG. 1 is a conceptual diagram for describing how a screen in Embodiment 1 is used.

DETAILED DESCRIPTION (Circumstances Leading Up to the Present Disclosure)

In conventionally known screens described in Japanese Unexamined Patent Application Publications No. 2011-113068 and No. 2015-212800, it is difficult to transmit a background with a high sharpness. The reason is that, since incident light from a background side of these screens is also refracted and diffused by the scattering layer, the sharpness of the background transmitted by the screens has a theoretical limitation. Furthermore, in these screens, it is also difficult to display an image with a high sharpness. The reason follows. The light diffused by the scattering layer of these screens is reflected by the interface between the back surface of the screens and the air and then displayed as an image. Accordingly, the light diffused by the scattering layer is further diffused before being reflected by the interface, so that the sharpness of the image is deteriorated. In particular, when an image is projected onto a screen attached to an indoor-side of a window pane of a commercial facility and observed from the indoor side, the window pane is present between the scattering layer provided in the screen and the interface reflecting the light. Thus, the scattering layer and the interface reflecting the light are distant, so that the sharpness of the image is further deteriorated. Moreover, as a diffusing degree of the scattering layer is raised for the purpose of increasing image brightness, the sharpness of the background and the image is deteriorated even further.

On the other hand, in the screen described in Japanese Unexamined Patent Application Publication No. 2014-071250, the transmittance of the selective reflection layer is given a remarkable wavelength dependence so that the selective reflection layer reflects light only at the specific wavelength. Accordingly, a color of the background that has been transmitted by the above-noted screen turns into a color that is considerably different from the original color. Since the above-noted screen needs to include three selective reflection layers individually reflecting red light, blue light, and green light in order to display a color image, the process becomes complicated, leading to high costs.

Furthermore, the screen described in Japanese Unexamined Patent Application Publication No. 2014-071250 selectively reflects the circularly polarized laser light with the specific wavelength. Thus, when the projector including a laser light source emitting circularly polarized light with the specific wavelength is used, an image with a close-to-original color is displayed. However, when a projector including a light source that generates red light, blue light, and green light by splitting white light from a white lamp or a projector including an LED light source having a broader emission spectrum than the laser light source is used, for example, an image having a color that is considerably different from the original color is displayed. Additionally, since the reflection efficiency lowers, a displayed image becomes dark.

In other words, in the screens described in Japanese Unexamined Patent Application Publications No. 2011-113068 and No. 2015-212800, it is difficult to transmit the background with a high sharpness and display the image with a high sharpness. On the other hand, in the screen described in Japanese Unexamined Patent Application Publication No. 2014-071250, the use of the projector including a specific laser light source makes it possible to transmit the background with a high sharpness and display the image with a high sharpness. However, if the projector including a light source other than the laser light source is used, it is still difficult to transmit the background having a close-to-original color and display the image having a close-to-original color.

Accordingly, the screen according to the present disclosure has a configuration in which a semi-transmissive reflecting layer formed on an uneven surface diffuses an image. In this way, even when using the projector including a light source other than the laser light source, it becomes possible to achieve a screen that can transmit the background having a close-to-original color with a high sharpness and display the image having a close-to-original color with a high sharpness.

The following is a detailed description of embodiments, with reference to the accompanying drawings. It should be noted however that an overly detailed description may be omitted in some cases. For example, a detailed description of a well-known matter or a redundant description of substantially the same structural components will be sometimes omitted. This is to avoid unneeded redundancy in the following description and facilitate understanding of a person having an ordinary skill in the art.

Incidentally, the attached drawings and the following description are provided in order for a person having an ordinary skill in the art to fully understand the present disclosure and not intended to limit the subject matter recited in the claims.

Hereinafter, embodiments will be described, with reference to the accompanying drawings.

(Embodiment 1)

FIG. 1 is a conceptual diagram for describing how screen 10 in Embodiment 1 is used. As illustrated in FIG. 1, screen 10 is a reflection-type transparent screen and mounted on window 20 of a building so as to display an image projected by projector 30. Screen 10 also transmits a background outside window 20. In other words, person 40 in front of screen 10 can observe on screen 10 the background outside window 20 and the image projected by projector 30 at the same time.

Screen 10 is a screen having a reflectivity, which causes diffuse reflection of an image projected by projector 30, and a transparency, which allows transmission of the background. Screen 10 both diffusely reflects part (5% to 50%) of incident visible light and rectilinearly transmits part (at least 30%) of the remaining visible light. By setting the above-mentioned proportion between the diffuse reflection and the rectilinear transmission, person 40 can observe the image and the background while keeping them in good balance on screen 10. When projector 30 projects no image, screen 10 functions as a transparent body, so that person 40 can observe the background in a similar manner as in the case where there is no screen 10. On the other hand, when projector 30 projects an image, since screen 10 diffusely reflects part of the projected image, person 40 can observe the projected image and further observe the background as well.

Light transmitted by screen 10 has to travel rectilinearly so that person 40 can observe the background sharply. Thus, a surface of screen 10 serving as an interface between screen 10 and the air needs to be flat. Since the surface of screen 10 is flat, it reflects light specularly. When an image projected by projector 30 and reflected specularly by the surface of screen 10 directly reaches eyes of person 40, person 40 is dazzled and cannot observe the image. Thus, as illustrated in FIG. 1, projector 30 projects an image onto screen 10 at a large incident angle so that the specularly reflected light does not travel toward person 40 located in a front direction of screen 10. Furthermore, projector 30 projects the image with an inclination angle from obliquely below near screen 10 so that the image projected by projector 30 is obstructed by person 40. Thus, an ultra short throw projector having a short focal length is used as projector 30. At this time, the incident angle of light entering screen 10 is about 65 degrees in a central portion of screen 10, about 75 degrees in left and right upper end portions thereof, and about 25 degrees at a center in a lower portion thereof. Here, the incident angle of light means an angle that a light incident direction forms with a direction normal to the surface of screen 10.

Visibility of the image displayed on screen 10 varies depending on conditions such as background brightness.

When the background is bright, for example, in the daytime, the background is brighter than the image, making it difficult for screen 10 to display the image with high contrast. Thus, when the background is bright, screen 10 is mainly used for displaying information or the like. On the other hand, when the background is dim, for example, at dusk, screen 10 can display the image with high contrast, allowing superimposition of the image and the background to produce an otherworldly presentation. Furthermore, when the background is sufficiently dark, for example, at night, screen 10 can display the image with high contrast similarly to a usual display apparatus.

Figure 2:
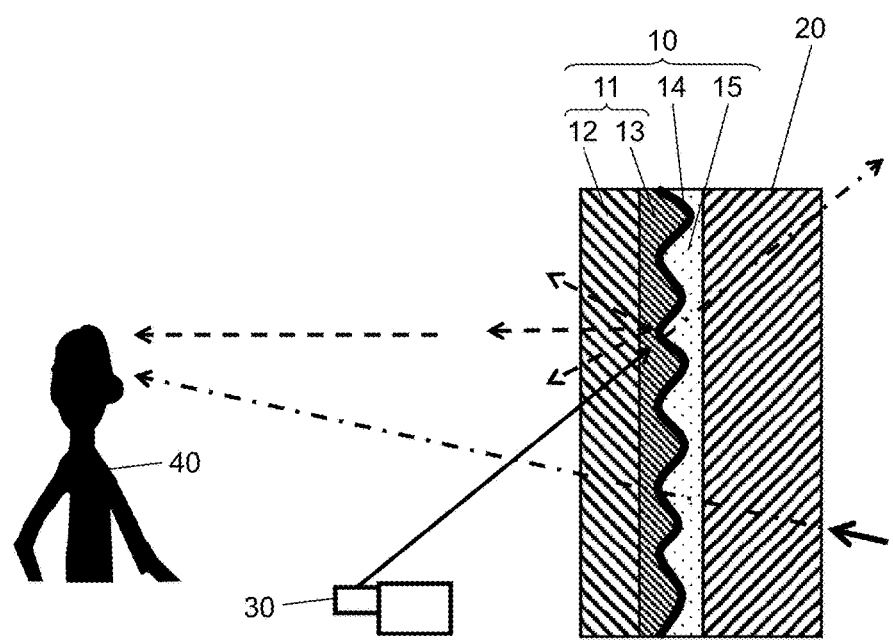
FIG. 2 is a conceptual diagram for describing a cross-sectional structure of the screen in Embodiment 1.

FIG. 2 is a conceptual diagram for describing a cross-sectional structure of screen 10 in Embodiment 1. As illustrated in FIG. 2, screen 10 includes uneven sheet 11, semi-transmissive reflecting layer 14, and adhesion layer 15. Uneven sheet 11 is formed of a transparent material and has one principal surface that is flat and the other principal surface that is an uneven surface provided with a plurality of recesses and protrusions. Reflecting layer 14 is formed on the uneven surface of uneven sheet 11. Adhesion layer 15 is a transparent layer covering reflecting layer 14.

Uneven sheet 11 includes base sheet 12 and transparent uneven layer 13. Base sheet 12 is formed of a transparent material such as polyethylene terephthalate (PET) with a flat surface and has a thickness ranging from 50 μm to 100 μm. Uneven layer 13 is formed of an ultraviolet curable resin on the surface of base sheet 12 such that uneven layer 13 has an uneven surface. This unevenness on uneven layer 13 determines a diffusing property of screen 10. With such a structure of uneven sheet 11, the light incident surface is flat, and the surface by which light is diffusely reflected is uneven.

Reflecting layer 14 is formed of a thin film that is disposed on an uneven side of uneven sheet 11 and has a thickness ranging from 2 nm to 1 μm. This structure allows one part of light entering screen 10 to be reflected and the other part thereof to be transmitted. In particular, it is possible to achieve a screen having a visible light transmittance of at least 30% and a visible light diffuse-reflectance ranging from 5% to 50%. In this way, person 40 can observe the image and the background on screen 10 in a well-balanced manner.

Reflecting layer 14 is a thin film having a thickness ranging from 2 nm to 50 nm, for example. This thin film is formed of any metal selected from nickel (Ni), aluminum (Al), silver (Ag), and chromium (Cr) or an alloy having any of nickel, aluminum, silver, and chromium as a principal component. With this configuration, reflecting layer 14 can be formed with a simple process of forming merely a single thin film.

Furthermore, reflecting layer 14 can also be a dielectric multilayer film having a thickness ranging from 0.5 μm to 1 μm. This dielectric multilayer film is obtained by alternately layering a plurality of layers of a transparent dielectric material with a high refractive index (n=2.0 to 3.0) and a transparent dielectric material with a low refractive index (n=1.0 to 1.9). The dielectric multilayer film can be provided with a desired reflecting property and a desired transmitting property by adjusting the refractive index of the material or the thickness of the dielectric multilayer film. Furthermore, with this structure, it becomes possible to reduce absorption of light entering screen 10 compared with the case in which reflecting layer 14 is formed of a metal thin film or an alloy thin film. This allows screen 10 to display the image with high brightness and transmit the background with high brightness.

Adhesion layer 15 is formed of a transparent adhesive that is based on an acrylic material and covers reflecting layer 14. The refractive index of adhesion layer 15 is substantially the same as the refractive index of uneven sheet 11, namely, about 1.5. Since adhesion layer 15 is formed on a back surface of screen 10, screen 10 can be attached to window 20.

As illustrated in FIG. 2, part of light that is projected by projector 30 and enters screen 10 from obliquely below is diffusely reflected in a direction normal to the surface of screen 10 and observed by person 40 as the image.

Figure 3:
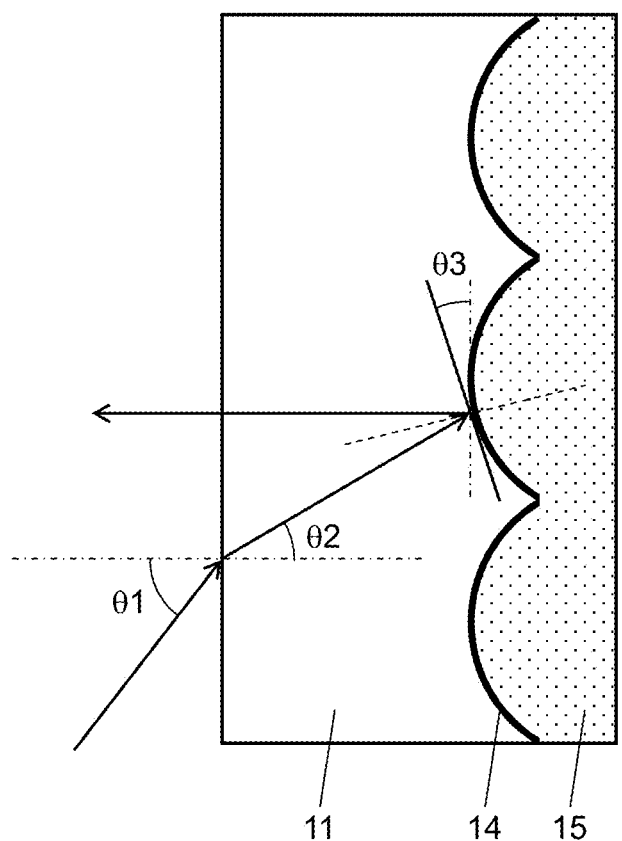
FIG. 3 illustrates a condition of an inclination angle of an uneven surface for allowing incident light from obliquely below to be reflected in a direction normal to a screen surface.

Now, referring to FIG. 3, the following description will be directed to a condition of inclination angle θ3 of the uneven surface of uneven sheet 11 for the light entering screen 10 from obliquely below to be reflected in the direction normal to the surface of screen 10. Herein, inclination angle θ3 is an angle that the flat surface of uneven sheet 11 forms with a tangent line at a light reflection point on the uneven surface of uneven sheet 11. Base sheet 12 and uneven layer 13 are formed of the transparent materials that have substantially the same refractive indices, and thus are optically homogeneous. Accordingly, in FIG. 3, base sheet 12 and uneven layer 13 are integrally illustrated as uneven sheet 11.

Light that has entered uneven sheet 11, which is formed of a transparent material having refractive index n, at incident angle θ1 from the flat surface side of uneven sheet 11 is refracted at angle θ2 obtained through Math 1 by Snell's law and travels in uneven sheet 11.

$$\theta 2 = \sin^{-1}\{\sin(\theta 1)/n\} \qquad \text{(Math 1)}$$

The condition for the light traveling in uneven sheet 11 to be reflected by reflecting layer 14 in the direction normal to the surface of screen 10 is that inclination angle θ3 of the uneven surface is half of angle θ2. In other words, inclination angle θ3 of the uneven surface for the light to be reflected in the direction normal to the surface of screen 10 can be obtained through Math 2.

$$\theta 3 = \sin^{-1}\{\sin(\theta 1)/n\}/2 \qquad \text{(Math 2)}$$

Figure 4:
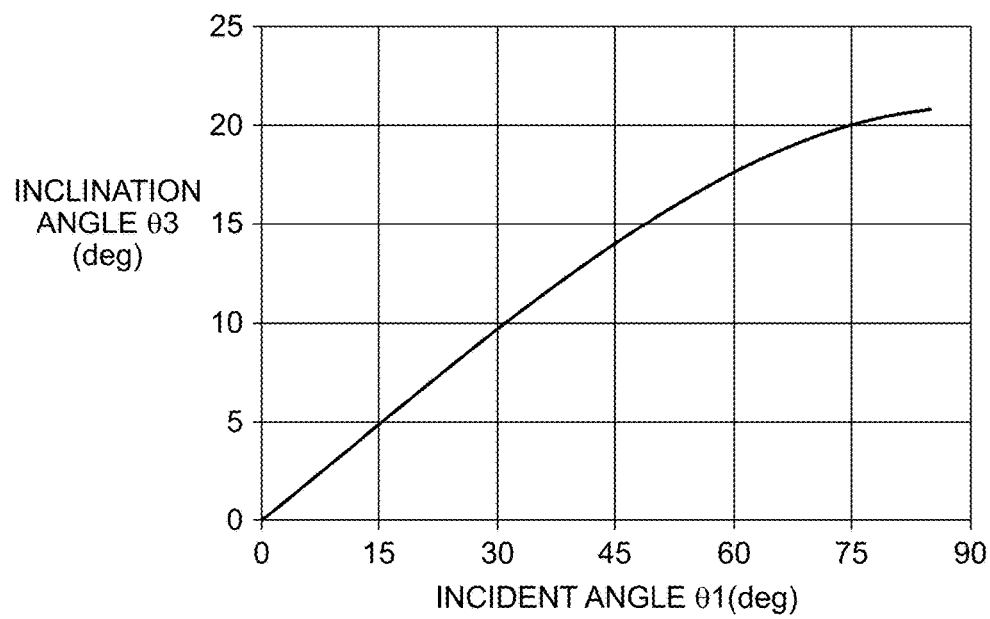
FIG. 4 illustrates a relationship between an incident angle of light and the inclination angle of the uneven surface.

Now, referring to FIG. 4, the following is a description of a relationship between incident angle θ1 and inclination angle θ3 of the uneven surface necessary for the light entering screen 10 at incident angle θ1 to be reflected by reflecting layer 14 in the direction normal to the surface of screen 10 in the case where refractive index n of uneven sheet 11 is 1.5, which is common among transparent resin materials.

As described earlier, incident angle θ1 of the light entering screen 10 is at most 75 degrees. As illustrated in FIG. 4, for the light entering screen 10 at an incident angle of 75 degrees to be reflected in the direction normal to the surface of screen 10, inclination angle θ3 of the uneven surface is 20 degrees. In order to allow person 40 to observe an image at various angles, the image needs to be diffused in a range of at least ±15 degrees from the direction normal to the surface of screen 10. Inclination angle θ3 necessary for reflected light to travel in the range of ±15 degrees from the direction normal to uneven sheet 11 ranges within about ±5 degrees. Thus, when incident angle θ1 has its maximal value of 75 degrees, inclination angle θ3 for the image to be diffused in the range of ±15 degrees from the direction normal to the surface of screen 10 is about 20±5 degrees. In other words, inclination angle θ3 of the uneven surface of uneven sheet 11 needs to have a distribution up to 25 degrees.

Moreover, light that has been reflected by reflecting layer 14 at inclination angle θ3 larger than 40 degrees is totally reflected by the interface between uneven sheet 11 and the air and returns to an inside of uneven sheet 11. Thus, inclination angle θ3 of larger than or equal to 40 degrees may reduce a reflection efficiency of screen 10. Consequently, it is appropriate that inclination angle θ3 be distributed in a range from 0 degree to 40 degrees.

Hereinafter, how the distribution of the inclination angle of the uneven surface is converted to numerical values will be described, with reference to FIGS. 5 to 8.

Figure 5:
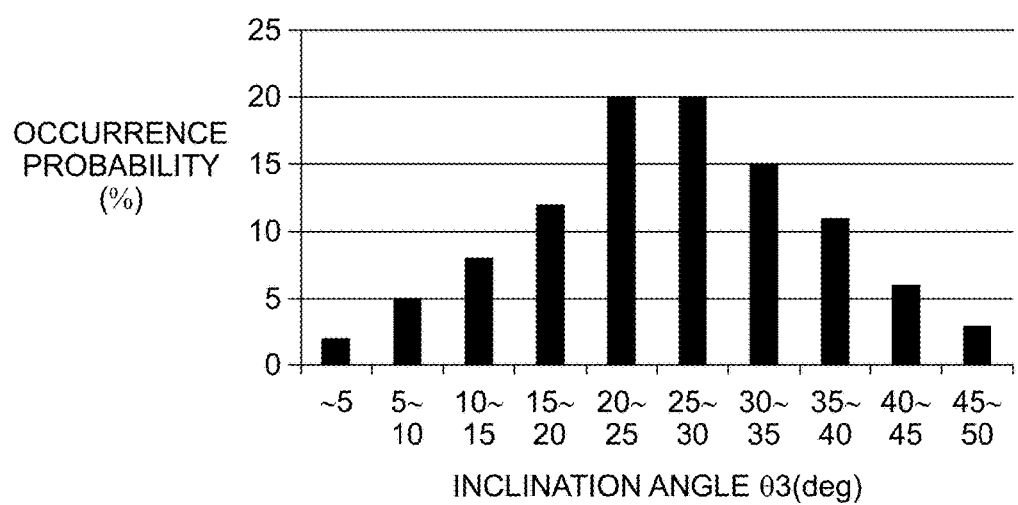
FIG. 5 illustrates a histogram of an occurrence probability of the inclination angle of the uneven surface in Embodiment 1.
Figure 7:
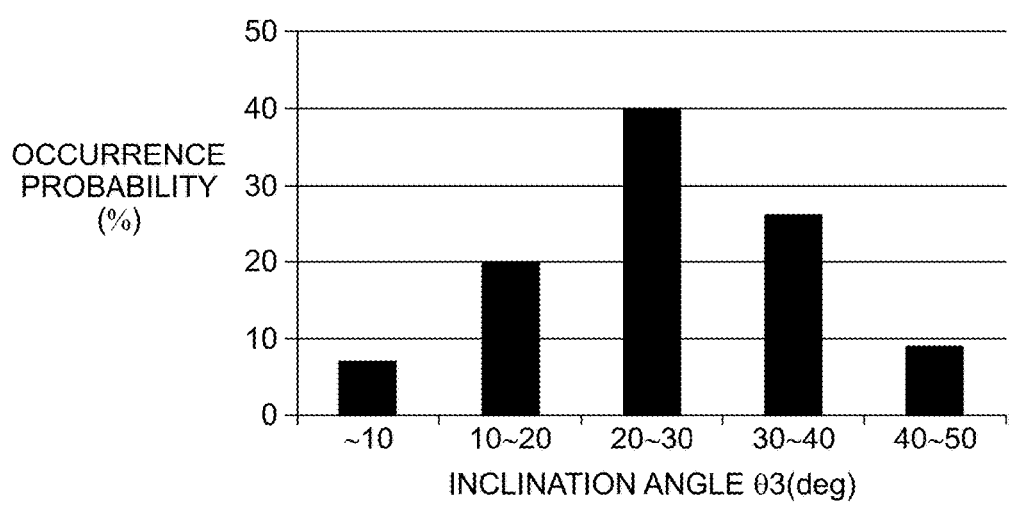
FIG. 7 illustrates a histogram of an occurrence probability of the inclination angle of the uneven surface in Embodiment 1.

FIG. 5 and FIG. 7 each illustrate a histogram of an occurrence probability of inclination angle θ3 of the uneven surface of uneven sheet 11. The histograms illustrated in FIG. 5 and FIG. 7 are obtained from an inclination angle distribution of the uneven surface measured using a three-dimensional measuring instrument or a laser microscope. Furthermore, the histograms illustrated in FIG. 5 and FIG. 7 are obtained from the same inclination angle distribution. In these figures, a horizontal axis indicates a range of inclination angle θ3 of the uneven surface, and a vertical axis indicates as the occurrence probability a proportion of the inclination angle of the uneven surface belonging to the range of the inclination angle indicated by the horizontal axis. Incidentally, in the horizontal axis, the inclination angle is broken down at intervals of 5 degrees in FIG. 5, whereas the inclination angle is broken down at intervals of 10 degrees in FIG. 7. Thus, profiles in the vertical axis of FIG. 7 are twice as high as profiles in the vertical axis of FIG. 5.

Figure 6:
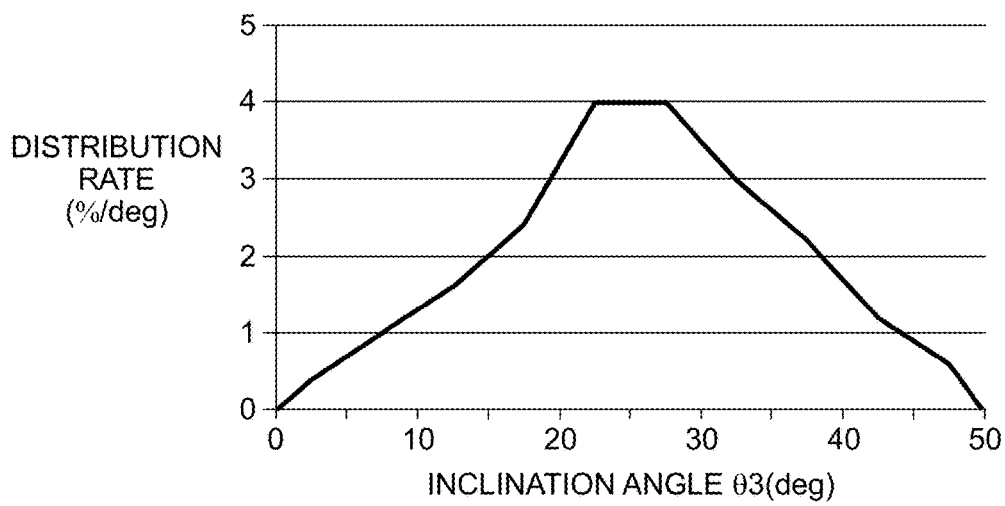
FIG. 6 illustrates a distribution rate of the inclination angle of the uneven surface in Embodiment 1.
Figure 8:
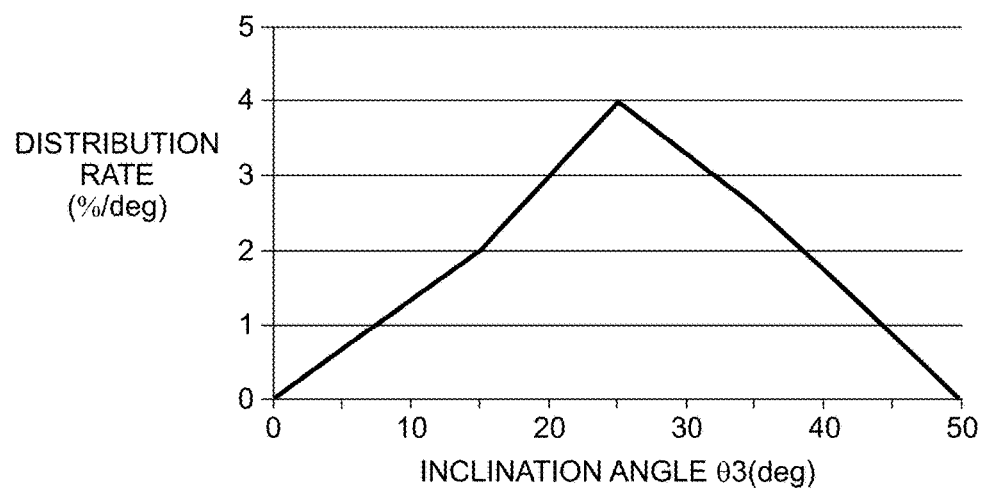
FIG. 8 illustrates a distribution rate of the inclination angle of the uneven surface in Embodiment 1.

On the other hand, FIG. 6 and FIG. 8 each illustrate a distribution rate of the inclination angle of the uneven surface of uneven sheet 11. FIG. 6 and FIG. 8 are obtained from FIG. 5 and FIG. 7, respectively. In FIG. 6 and FIG. 8, a horizontal axis indicates a median of each range of the inclination angle indicated by each horizontal axis of FIG. 5 and FIG. 7, and a vertical axis indicates a value obtained by dividing the occurrence probability indicated by each range of the inclination angle by the range of the inclination angle. An example thereof will be described with reference to FIG. 5 and FIG. 6. In FIG. 5, the occurrence probability indicated by the range of inclination angle θ3 from 20 degrees to 25 degrees is 20%. Accordingly, in FIG. 6, the horizontal axis indicates 22.5 degrees, which is a median of the range from 20 degrees to 25 degrees, and a corresponding value on the vertical axis is 4%/degree, which is a value obtained by dividing the occurrence probability, i.e., 20% by the range of inclination angle θ3, i.e., 5 degrees. In this manner, it becomes possible to convert the distribution of the inclination angle to numerical values independently of how the range of the inclination angle is broken down. In other words, profiles in the vertical axis of FIG. 8 are the same as profiles in the vertical axis of FIG. 6.

Incidentally, although details are omitted here, the distribution rate of inclination angle θ3 may be calculated in the following manner when the uneven surface is formed of a transparent material as is uneven layer 13. A parallel light beam is allowed to enter the uneven surface, and a luminous intensity distribution of the transmitted light is measured. Then, a differential equation obtained by simultaneously satisfying a differential form serving as a definitional expression of the luminous intensity distribution and a differential form serving as a definitional expression of the inclination angle distribution is solved. In this manner, the distribution rate of inclination angle θ3 of the uneven surface may be calculated.

Various uneven surfaces have been examined to show an appropriate case of the distribution of the inclination angle of the uneven surface of uneven sheet 11 used as a base of screen 10 where the distribution rate of inclination angle θ3 of 25 degrees is at least 0.3%/degree and the percentage that the distribution rate of inclination angle θ3 of at least 40 degrees accounts for is at most 20%. Here, the percentage that the distribution rate of inclination angle θ3 of at least 40 degrees accounts for means a percentage of a value obtained by integrating the distribution rate in a range exceeding the inclination angle of 40 degrees with respect to a value obtained by integrating the distribution rate over an entire range of inclination angle θ3. With this structure, screen 10 can diffusely reflect the image in a range that is observed by person 40, thereby suppressing the total reflection within screen 10.

On the other hand, arithmetic average roughness (Ra) of the uneven surface and an average pitch between the plurality of recesses and protrusions formed on the uneven surface, etc. affect ease of attachment processing and definition of an image. Furthermore, when the plurality of recesses or protrusions formed on the uneven surface have a periodic structure, a relative pitch between the plurality of recesses or protrusions and pixels in the image may cause a moiré effect.

The study has shown an appropriate case where the uneven surface of uneven sheet 11 has an arithmetic average roughness ranging from 0.5 μm to 2 μm. Furthermore, an appropriate case has also been found where the plurality of recesses and protrusions formed on the uneven surface are located randomly and have an average pitch therebetween ranging from 5 μm to 20 μm. Moreover, an appropriate case has been found where uneven layer 13 has a thickness ranging from 5 μm to 20 μm. The thickness of uneven layer 13 means an average of the thickness of uneven layer 13. With this structure, screen 10 can display a high-definition image and suppress the moiré effect.

When the image projected by projector 30 enters screen 10 as indicated by a solid line arrow in FIG. 2, it is diffusely reflected by reflecting layer 14 formed on the uneven surface as indicated by broken line arrows. Then, person 40 observes part of the diffusely reflected light as an image. The remaining light of the image projected by projector 30 that is not reflected or absorbed by reflecting layer 14 passes through reflecting layer 14 and leaves screen 10 for an outside as indicated by an alternate long and short dashed line arrow.

As described above, the brightness of the image displayed on screen 10 is related to the reflectance, in particular, proportional to the diffuse reflectance of screen 10. Thus, when an image is to be displayed, a higher diffuse reflectance of screen 10 is more favorable. However, when no image is to be displayed, a higher diffuse reflectance of screen 10 causes screen 10 to look more whitish because ambient light such as illumination light on a person 40 side is diffusely reflected by screen 10. Furthermore, since screen 10 has a lower transmittance with increasing reflectance, the background transmitted by screen 10 looks darker. Thus, when the diffuse reflectance of screen 10 is raised excessively, the visibility of the background decreases.

On the other hand, part of background light entering from a window 20 side as indicated by a thick line arrow is diffusely reflected by reflecting layer 14 by the same mechanism as the image projected by projector 30 (not shown). Then, the remaining background light that is not reflected or absorbed by reflecting layer 14 passes through reflecting layer 14 and reaches person 40 as indicated by an alternate long and short dashed line arrow.

At this time, uneven layer 13 and adhesion layer 15 are both formed of a transparent resin material and have substantially the same refractive indices, which are about 1.5. Thus, the projected image is not refracted but transmitted rectilinearly, and leaves screen 10 as indicated by an alternate long and short dashed line arrow at the same angle as the incident light indicated by the solid line arrow. In order to prevent even a slight amount of refraction, the refractive indices of the transparent material of uneven layer 13 and that of adhesion layer 15 may be adjusted and made strictly the same. The brightness of the background to be observed is proportional to the transmittance of screen 10. Thus, from the viewpoint of transmitting the background, a higher transmittance of screen 10 is more favorable.

In screen 10, the remaining light that is not transmitted or reflected is absorbed. Such absorption may occur naturally as a property intrinsic to the material or may be given to the material in expectation for a specific effect. The absorption reduces the brightness of both the image and the background. Thus, in order to prevent the brightness of the image and the background from decreasing, less absorption is more favorable. However, increasing the absorption is expected to produce an effect of suppressing the contrast reduction caused by external light when displaying an image.

As described above, in order for screen 10 to function as a reflection-type transparent screen, light has to be appropriately allocated among the transmission, reflection, and absorption. The allocation balance varies depending on intended applications.

As a result of the study, at least 5% diffuse reflectance of screen 10 has been found suitable for displaying an image brightly. In order to enhance the visibility of the background when no image is displayed, at most 50% diffuse reflectance and at least 30% transmittance of screen 10 are favorable. Put another way, it is appropriate that screen 10 may have a visible light transmittance of at least 30% and a visible light diffuse reflectance ranging from 5% to 50%, for example. The absorption is allowed or positively given as long as the above-noted condition is satisfied.

As described above, in the present embodiment, screen 10 is a screen having a reflectivity, which causes diffuse reflection of the image projected by the projector, and a transparency, which allows transmission of the background, and includes uneven sheet 11, semi-transmissive reflecting layer 14, and the transparent layer. Uneven sheet 11 is formed of a transparent material and has one principal surface that is flat and the other principal surface that is an uneven surface provided with the plurality of recesses and protrusions. Reflecting layer 14 is formed on the uneven surface of uneven sheet 11. The transparent layer covers reflecting layer 14. Reflecting layer 14 is a thin film having a thickness ranging from 2 nm to 1 µm.

In this way, light entering screen 10 from the background side is not easily refracted in screen 10. Thus, screen 10 can transmit the background with a high sharpness.

Furthermore, since light entering screen 10 is diffusely reflected by semi-transmissive reflecting layer 14 and displayed as the image, it is not excessively diffused inside screen 10. Thus, screen 10 can display the image with a high sharpness.

Moreover, reflecting layer 14 can transmit and reflect light even if it does not have a notable wavelength dependence. Thus, screen 10 can transmit the background having a close-to-original color to display the image having a close-to-original color.

The following description will be directed to examples.

EXAMPLE 1

Using an acrylic ultraviolet curable resin, uneven layer 13 having one uneven surface was formed in a mold by a photo polymer method (2P method). This uneven layer 13 was transferred onto a surface of base sheet 12 that was formed of PET and had a thickness of 75 µm, thus obtaining uneven sheet 11.

Figure 9:
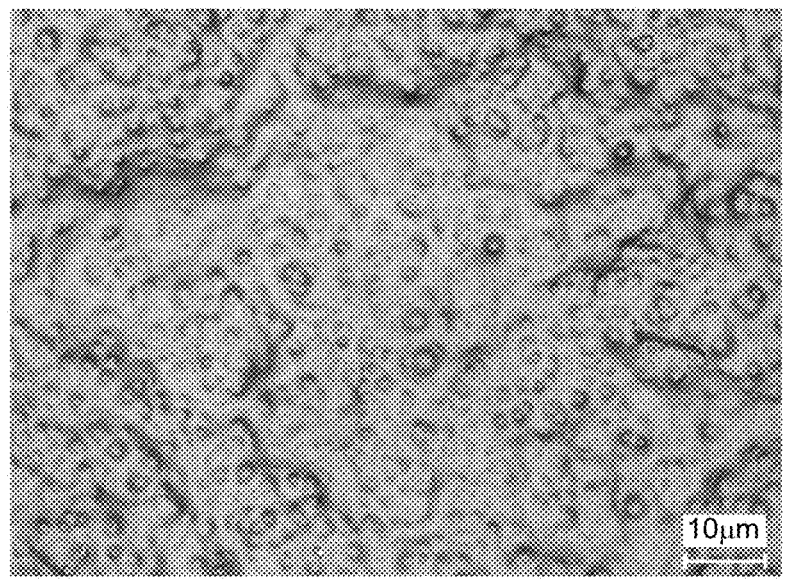
FIG. 9 illustrates a microphotograph of an uneven surface in Example 1.
Figure 10:
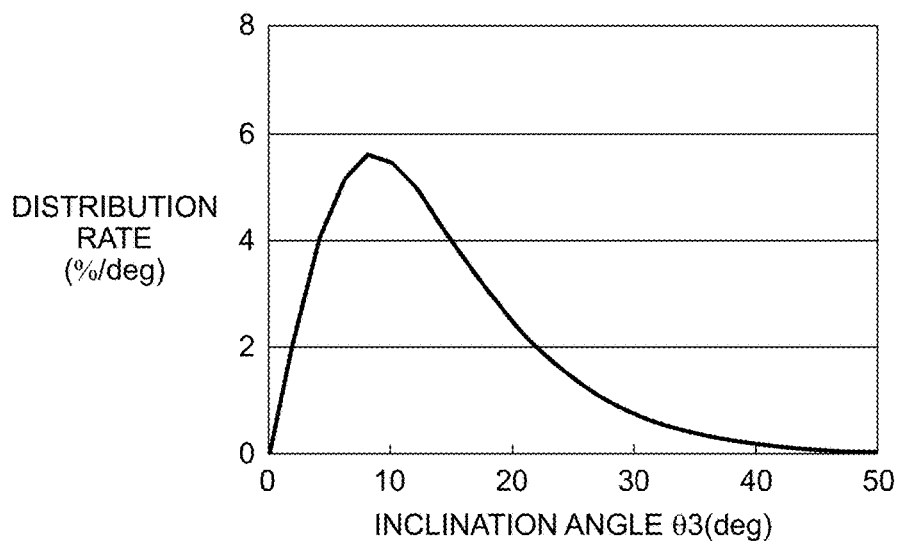
FIG. 10 illustrates a distribution rate of an inclination angle of the uneven surface in Example 1.

FIG. 9 illustrates a microphotograph of an uneven surface of uneven sheet 11 in Example 1. FIG. 10 illustrates a distribution rate of inclination angle θ3 of the uneven surface of uneven sheet 11 in Example 1. As illustrated in FIG. 9, a plurality of recesses and protrusions formed on the uneven surface of uneven sheet 11 were located randomly. Further, the uneven surface had an arithmetic average roughness (Ra) of 0.65 µm.

Additionally, as for the distribution of the inclination angle of the uneven surface of uneven sheet 11, the distribution rate of inclination angle θ3 of 25 degrees was 1.4%/degree, and the percentage that the distribution rate of inclination angle θ3 of at least 40 degrees accounts for was 1%.

Next, a nickel (Ni) thin film having a thickness of 20 nm was sputtered on the uneven surface of uneven sheet 11, thus obtaining semi-transmissive reflecting layer 14.

On the uneven surface side of uneven sheet 11 where reflecting layer 14 was formed, adhesion layer 15 of an acrylic adhesive was formed so as to cover reflecting layer 14. This allowed screen 10 to be bonded to a window formed of a glass material. In the above-described manner, screen 10 was produced.

Figure 11:
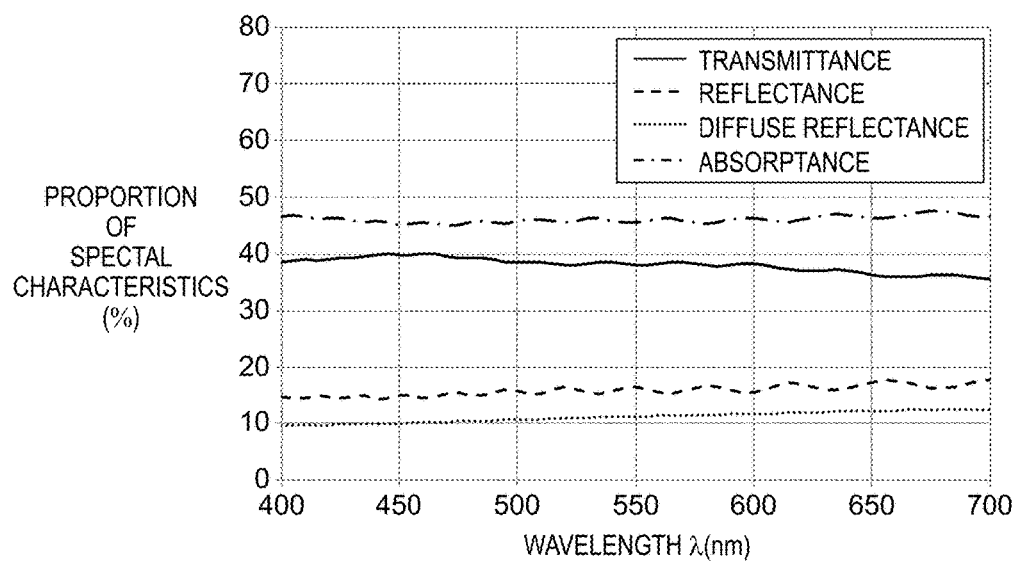
FIG. 11 illustrates spectral characteristics of a screen in Example 1.

FIG. 11 illustrates results of measuring spectral characteristics of screen 10 in Example 1. FIG. 11 illustrates the spectral characteristics of screen 10 in Example 1. The spectral characteristics were calculated as follows. The transmittance was calculated by measuring total transmitted light using an integrating sphere. Furthermore, the reflectance was calculated by measuring total reflected light using the integrating sphere. Moreover, the diffuse reflectance was calculated by measuring diffusely reflected light with a configuration in which regularly reflected light was allowed to escape through an opening. The absorptance was calculated by subtracting the transmittance and the reflectance from 100%.

The brightness of the background transmitted by screen 10 is proportional to the transmittance. Furthermore, the brightness of the image displayed as a reflected image by screen 10 is related to the reflectance, in particular, proportional to the diffuse reflectance. Out of the reflected light, light specularly reflected by the surface of screen 10 travels outward from a field of view of person 40, and light diffusely reflected by reflecting layer 14 can be observed by person 40. Accordingly, FIG. 11 also illustrates the diffuse reflectance.

As illustrated in FIG. 11, all of the transmittance, reflectance, and absorptance had a low wavelength dependence (at most ±10%) in a visible light wavelength range (wavelength λ=400 nm to 700 nm). Thus, screen 10 can transmit the background having a close-to-original color to display the image having a close-to-original color. Now, Table 1 shows root-mean square values obtained by weight-averaging the spectral characteristics of screen 10 with a luminosity factor.

TABLE 1

| | Example 1 | Example 2 |
|---|---|---|
| Reflecting layer | Ni thin film | Dielectric multilayer film |
| Transmittance (%) | 38 | 66 |
| Reflectance (%) | 16 | 27 |
| Diffuse reflectance (%) | 11 | 23 |
| Absorptance (%) | 46 | 7 |

TABLE 1-continued

| | Example 1 | Example 2 |
|---|---|---|

As illustrated in FIG. 11 and Table 1, the weight-averaged transmittance was 38%, which was somewhat low. Thus, the background transmitted by screen 10 becomes slightly dark. On the other hand, since the spectral characteristics had a low wavelength dependence, the image was displayed sharply with its close-to-original color and not easily affected by the brightness of the background.

As described above, with simple process and structure in which a single layer of a metal thin film was formed on uneven sheet 11, it was possible to produce a screen that was capable of transmitting the background with a high sharpness and displaying the image with a high sharpness.

Incidentally, by adjusting the thickness of the nickel thin film, the proportion between the transmission and the reflection can be adjusted. It should be noted however that an increase in the thickness of the nickel thin film raises the absorption intrinsic to a metal thin film.

EXAMPLE 2

Screen 10 was produced similarly to Example 1 except that, instead of the nickel thin film, a dielectric multilayer film having a thickness of 0.88 μm was formed to obtain semi-transmissive reflecting layer 14.

The dielectric multilayer film was formed by alternately layering niobium pentoxide, which is a transparent dielectric material with a high refractive index (n=2.33), and silicon dioxide, which is a transparent dielectric material with a low refractive index (n=1.46).

Figure 12:
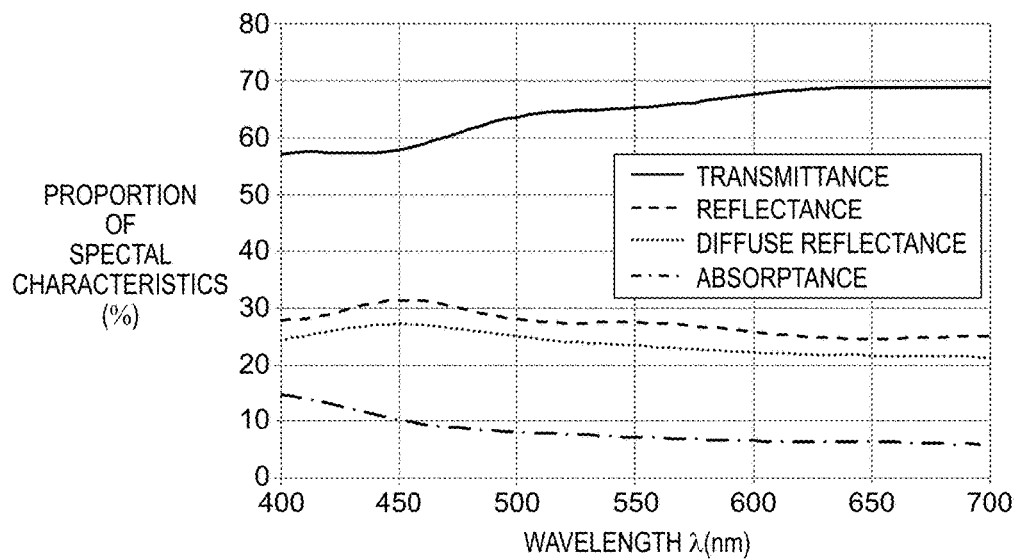
FIG. 12 illustrates spectral characteristics of a screen in Example 2.

FIG. 12 and Table 1 illustrate results of measuring spectral characteristics of screen 10 in Example 2. FIG. 12 illustrates the spectral characteristics of screen 10 in Example 2.

By forming the dielectric multilayer film to obtain reflecting layer 14, the absorptance of the spectral characteristics considerably decreased (by 85%) compared with the case of the metal thin film in Example 1. Moreover, the transmittance increased by 1.7 times, and the diffuse reflectance increased by 2.0 times. Accordingly, the brightness of the background transmitted by screen 10 and the brightness of the displayed image increased by 1.7 times and 2.0 times, respectively.

As described above, by forming semi-transmissive reflecting layer 14 using the dielectric multilayer film, it was possible to reduce the absorptance compared with the case of using the metal thin film. Thus, screen 10 can display the image with a high brightness and transmit the background with a high brightness.

It should be noted that, in the case of using the dielectric multilayer film, the transmittance and the reflectance may be set substantially arbitrarily, and a separate absorption layer can also be used to improve contrast.

(Other Embodiments)

In the embodiment described above, PET has been used as the material for base sheet 12. However, the material for base sheet 12 is not limited to PET. The material for base sheet 12 only needs to be a transparent resin material and may be, for example, a polymethyl methacrylate (PMMA) resin or polycarbonate.

Although uneven layer 13 has been formed using the acrylic ultraviolet curable resin, a method for forming uneven layer 13 is not limited to this. Uneven layer 13 may be formed using another ultraviolet curable resin or using another production method such as hot pressing.

Although uneven layer 13 was formed using the mold in the above-described examples, a method for forming uneven layer 13 is not limited to this. Uneven layer 13 may be formed as follows. A transparent adhesive liquid in which transparent spherical particulates are dispersed is applied onto smooth base sheet 12. Then, the applied adhesive liquid is thermally dried or cured with ultraviolet rays, thus forming uneven layer 13. In this manner, uneven layer 13 may be formed.

Moreover, in the embodiment described above, the transparent layer covering reflecting layer 14 has included adhesion layer 15. However, the transparent layer does not have to include adhesion layer 15 alone. The transparent layer may include adhesion layer 15 and window 20. In other words, adhesion layer 15 formed of a transparent acrylic adhesive may be attached to window 20, which is a transparent glass base, thereby obtaining the transparent layer covering reflecting layer 14. Furthermore, for example, a transparent resin material such as PMMA or polycarbonate may be used for window 20, and a thermosetting transparent material may be used for adhesion layer 15.

Moreover, depending on intended applications, screen 10 may include, instead of adhesion layer 15, a transparent layer that includes no adhesive and is formed of a transparent resin.

The screen disclosed herein is capable of transmitting a background having a close-to-original color with a high sharpness and displaying an image having a close-to-original color with a high sharpness even when using a projector having a light source other than a laser light source. Thus, the present disclosure is useful as a screen or the like having a reflectivity, which causes diffuse reflection of the image projected by the projector, and a transparency, which allows transmission of the background.

What is claimed is:

1. A screen having a reflectivity, which causes diffuse reflection of an image projected by a projector, and a transparency, which allows transmission of a background, the screen comprising:
    an uneven sheet that comprises a transparent material, and has a first principal surface that is flat and a second principal surface that is an uneven surface provided with a plurality of recesses and protrusions, the first principal surface and the second principal surface being opposite to each other;
    a reflecting layer that is semi-transmissive and formed on the uneven surface of the uneven sheet; and
    a transparent layer that covers the reflecting layer,
    wherein the uneven surface has an inclination angle distribution in which a distribution rate of an inclination angle of 25 degrees is at least 0.3%/degree and a percentage that the distribution rate of the inclination angle of at least 40 degrees accounts for is at most 20%.

2. The screen according to claim 1,
    wherein the reflecting layer is a thin film and comprises any metal selected from the group consisting of nickel, aluminum, silver, and chromium, or comprises an alloy containing as a principal component any metal selected from the group consisting of nickel, aluminum, silver, and chromium, and has a thickness ranging from 2 nm to 50 nm.

3. The screen according to claim 1,
    wherein the reflecting layer is a thin film and comprises a dielectric multilayer film obtained by alternately layering a plurality of layers of a transparent dielectric material with a high refractive index and a transparent dielectric material with a low refractive index, and has a thickness ranging from 0.5 µm to 1 µm.

4. The screen according to claim 1,
wherein the uneven surface has an arithmetic average roughness ranging from 0.5 µm to 2 µm,
the plurality of recesses and protrusions are located randomly, and
the plurality of recesses and protrusions have an average pitch ranging from 5 µm to 20 µm.

5. The screen according to claim 1, which has a visible light transmittance of at least 30% and a visible light diffuse reflectance ranging from 5% to 50%.

6. The screen according to claim 1,
wherein the transparent layer is an adhesion layer containing an adhesive.

7. The screen according to claim 1,
wherein the uneven sheet includes a base sheet and an uneven layer.

8. The screen according to claim 7,
wherein the uneven layer has a thickness ranging from 5 µm to 20 µm.

9. The screen according to claim 1,
wherein the screen has a reflectivity, which causes diffuse reflection such that an image projected by a projector entering the screen at an incident angle of 75 degrees is diffusely reflected in the direction normal to the surface of the screen.

10. A projection system projecting an image, the projection system comprising:
a screen having a reflectivity, which causes diffuse reflection of the image projected by a projector, and transparency which allows transmission of a background, the screen including:
an uneven sheet that comprises a transparent material, and has a first principal surface that is flat and second principal surface that is an uneven surface provided with a plurality of recesses and protrusions, the first principal surface and the second principal surface being opposite to each other;
a reflecting layer that is semi-transmissive and formed on the uneven surface of the uneven sheet; and
a transparent layer that covers the reflecting layer; and
a projector, projecting the image onto the screen,
wherein the uneven surface has an inclination angle distribution in which a distribution rate of an inclination angle of 25 degrees is at least 0.3%/degree and a percentage that the distribution rate of the inclination angle of at least 40 degrees accounts for is at most 20%.

* * * * *